United States Patent [19]

Murakami et al.

[11] Patent Number: 5,086,896
[45] Date of Patent: Feb. 11, 1992

[54] JAW CLUTCH COUPLING MECHANISM AND SHIFT LEVER LINK MECHANISM

[75] Inventors: Yoshiaki Murakami; Takahisa Murakami; Akira Kikuchi, all of Ehime, Japan

[73] Assignee: Kabushiki Kaisha Kobe Seiko Sho, Kobe, Japan

[21] Appl. No.: 587,865

[22] Filed: Sep. 25, 1990

[30] Foreign Application Priority Data

Nov. 30, 1989 [JP] Japan .................. 1-311614
Dec. 18, 1989 [JP] Japan .................. 1-327727

[51] Int. Cl.$^5$ .................. F16D 21/04; F16D 11/12
[52] U.S. Cl. .................. 192/48.91; 74/370; 74/665 GA; 192/51; 192/71; 192/93 C; 192/107 T
[58] Field of Search .................. 192/71, 93 C, 48.91, 192/51, 107 T; 74/665 GA, 370, 377; 180/6.66

[56] References Cited

U.S. PATENT DOCUMENTS

| | | | |
|---|---|---|---|
| 1,126,924 | 2/1915 | Valoppi | 192/71 |
| 2,101,366 | 12/1937 | Frank | 192/71 |
| 2,105,680 | 1/1938 | Weiss | 74/377 X |
| 2,133,568 | 10/1938 | Perkins | 192/71 X |
| 2,508,558 | 5/1950 | Wolff | 192/93 C |
| 3,216,541 | 11/1965 | Steffen | 74/665 GA X |

FOREIGN PATENT DOCUMENTS 1102262 10/1955 France .................. 192/71

Primary Examiner—Rodney H. Bonck
Attorney, Agent, or Firm—Oblon, Spivak, McClelland, Maier & Neustadt

[57] ABSTRACT

A jaw clutch coupling mechanism in which spline grooves serving as ball drop-in portions of the clutch are provided with a semi-spherical ball support recess to be engaged with a steel ball by way of linear or surface contact for enhancing the strength of the jaw clutch. A stopper is provided in the shift lever link mechanism to hold the shift lever securely in the forward, neutral or reverse position, and a shock absorber is provided in association with the shifter arm of the jaw clutch to dampen the shocks of engagement of the clutch, ensuring a better feeling in shift lever operations.

4 Claims, 11 Drawing Sheets

FIG. II
PRIOR ART

JAW CLUTCH COUPLING MECHANISM AND SHIFT LEVER LINK MECHANISM

BACKGROUND OF THE INVENTION

1. Field of the Invention

This invention relates to a jaw clutch, and more particularly to a jaw clutch coupling mechanism suitable for use on working vehicles such as power rice-planters, power cultivators, ultra mini shovel cars and the like, having steel ball drop-in portions with a broadened contact surface to ensure improved surface pressure strength, and to a shift lever link mechanism adapted to reduce the shocks of engagement at the time of operating a shift lever.

2. Description of the Prior Art

FIGS. 11 through 14 illustrate a conventional jaw clutch of this sort. Shown in FIG. 11 is a jaw clutch for switching the operation either to forward or reverse drive, wherein indicated at 1 and 2 are forward and reverse gears which are provided with opposingly disposed cylindrical extensions 3 and 4, respectively, and which are rotatable in opposite directions about a driven shaft 5. The extensions 3 and 4 are provided with open holes 6 in uniformly spaced positions in the circumferential direction to retain steel balls 7 therein. On the other hand, as shown in FIG. 12, the driven shaft 5 is provided with spline grooves 8 circumferentially at uniform intervals to provide ball drop-in portions in a pitch corresponding to the ball retainer holes 6. The spline grooves or drop-in portions 8 are formed in such a way as to have a width greater than the steel balls 7, providing a play to ensure that the steel balls 7 easily engage the drop-in portions 8.

Upon axially sliding a slider 9 which is fitted around the driven shaft 5 and gear extensions 3 and 4 by means of a shifter 10, the steel balls 7 of either the forward gear 1 or reverse gear 2 are pushed into the drop-in portions 8 on the driven gear 5 as indicated in phantom to transmit forward or reverse rotation to the driven gear 5.

Further, as shown in FIG. 13, the driven shaft 11 is provided with a plural number of rows of coupling grooves 12 on its circumferential surface in positions opposing the ball retainer holes 6. The drop-in portions 12 are in the form of slots extending in the circumferential direction and, as shown also in FIG. 14, have the respective opposite end portions 12a rounded in conformity with the shape of the steel balls 7.

The slider of the above-described jaw clutch is coupled with the shifter which is linked to a shift lever through a link mechanism for on-off operations of the clutch. However, there has been a problem that, when the shift lever is operated to engage the jaw clutch, the coupling members are repulsed by the shocks of engagement, and the coupling shocks are transmitted to the shift lever through the link mechanism and to the hand of the operator.

In the conventional jaw clutch shown in FIGS. 11 and 12, the ball drop-in portions 8 are provided with a play to facilitate the engagement of the steel balls 7. However, in case the drop-in portions 8 have a large play, the steel balls 7 are violently hit against the side walls 8a of the drop-in portions 8. Since, the ball drop-in portions 8a are in the form of spline grooves with straight side walls 8a in the axial direction, the steel balls 7 are brought into point contact with the side walls 8a, leaving percussive impressions d on the side walls 8a when the strength of the latter is deficient.

On the other hand, the steel balls 7 are easily engageable in case of the driven shaft 11 which is provided with drop-in portions 12 in the form of slots with rounded ends 12a as shown in FIGS. 13 and 14, but the process of machining the ball drop-in portions 12 by an end mill is time-consuming and leads to a higher production cost.

SUMMARY OF THE INVENTION

It is therefore an object of the present invention to provide a jaw clutch coupling mechanism which employs ball drop-in portions with a suitable play and an increased surface pressure strength against steel balls to ensure improved durability in use, and yet which involves only a low machining cost.

In accordance with the present invention, the above-stated objective is achieved by the provision of a jaw clutch coupling mechanism employing steel balls to be disengageably engaged with ball drop-in portions on a driven shaft by sliding movement of a slider fitted on the driven shaft, the jaw clutch coupling mechanism comprising: a pair of driven shafts disposed within a gear case independently of and in parallel relation with each other to serve as FR switching shafts; forward and reverse gears freely and rotatably mounted on each FR switching shaft; and spline grooves formed axially on the circumferential surface of each FR switching shaft to serve as ball drop-in portions.

According to the invention, the above-mentioned spline grooves are provided with a semi-spherical ball support recess on a side wall portion to be engaged with a steel ball of the forward gear in forward rotation. Similarly, the spline grooves are also provided with a semi-spherical ball support recess on a side wall portion to be engaged with a steel ball of the reverse gear in reverse rotation.

According to another aspect of the invention, there is provided a shift lever link mechanism for jaw clutch, including: an input shaft disposed longitudinally within a gear case; a couple of FR switching shafts rotatably supported on the opposite sides of the input shaft in parallel relation therewith; a shifter coupled with a slider of the jaw clutch; a pivotally rockable shifter arm having one end thereof connected to the shifter; a shifter rod connected to the other end of the shifter arm through a shock absorber; a shift lever connected to the shifter rod; and a shaft level stopper provided on one side of the shift lever for releasably stopping same in one of forward, neutral and reverse positions.

Preferably, the shock absorber of the shift lever link mechanism includes stopper members fixed on the shifter rod in a predetermined spaced relation in the axial direction thereof, a stopper ring slidably fitted between the two stopper members, and a spring interposed between the stopper ring and each stopper member.

The above-mentioned shift lever stopper of the shift lever link mechanism includes a spring case provided on one side of the shift lever, and a slider slidably fitted in the spring case and biased in one direction by a spring, the slider having a roller mounted in a lower portion thereof and pressed against a cam plate.

The above-mentioned shift lever stopper of the shift lever link mechanism includes a guide groove formed on the lower side of the slider and adapted to fit on an upper marginal edge portion of the cam plate, lateral holes formed on the opposite sides of the guide groove of the slider perpendicularly to the cam plate, a roller fitted in the lateral holes and having a center portion formed in a smaller diameter than the opposite side portions thereof and abutted against the upper marginal edge portion of the cam plate.

The shift lever stopper of the shift lever link mechanism is provided with stopper grooves along the upper marginal edge of the cam plate to determine the forward, neutral and reverse positions of the shift lever, the stopper grooves of the forward and reverse positions being provided with a chamfered portion in the respective center portions.

According to the present invention, the axial spline grooves are provided with semi-spherical ball support recess in the side wall portions as ball drop-in portions, with a sufficient play in the rotational direction of the driven shaft to be engaged with the steel balls. Accordingly, the steel balls are engaged with the ball drop-in portions in a facilitated manner with less possibilities of being repulsed at the time of engagement of the clutch. Besides, since the ball support recesses are formed in a semi-spherical shape, which holds the respective recesses in line or surface contact with the steel balls to ensure higher surface pressure strength. Therefore, there will be no possibility of the steel balls making percussive impressions when hit against the end portions of the ball drop-in portions at the time of engagement of the clutch.

Subsequent to machining the spline grooves, the semi-spherical ball support recesses are formed simply into the side wall portions in the rotational direction of the spline grooves by the use of an end mill, so that the machining process requires only a short machining time and a low machining cost.

If the shift lever in the neutral position is turned into the forward or reverse position, the shifter rod is displaced through the link mechanism. The stopper member is displaced integrally with the shifter rod, thereby compressing one of the springs on the opposite sides of the stopper ring while uncompressing the other spring. At this time, the stopper ring and the shifter arm which is pivotally connected to the stopper ring are not moved until the shifter rod is slided through the stopper ring and the shift lever is turned into the forward or reverse position. After the shift lever has been stopped in the forward or reverse position, the stopper ring is pushed in the direction of the displacement of the shifter rod into a median position between the two stopper members by a restitutive action of the compressed spring, accompanied by a sliding movement of the shifter rod. Consequently, the shifter arm which has its fore end pivotally connected to the stopper ring is turned, sliding the slider along with the shifter in the gear case to engage the jaw clutch.

Namely, firstly the shift lever is turned and stopped in a selected position, and then the shifter arm which is pivotally connected to the stopper ring is forcibly turned by the pressure of the spring, thereby sliding the slider to engage the jaw clutch even when the coupling portions are repulsed. The shocks at the time of engagement of the jaw clutch are absorbed by the springs on the opposite sides of the stopper ring to prevent direct transmission of the shocks of engagement to the shift lever.

The above and other objects, features and advantages of the invention will beome apparent from the following description, taken in conjunction with the accompanying drawings which show by way of example preferred embodiments of the invention.

BRIEF DESCRIPTION OF THE DRAWINGS

In the accompanying drawings:

FIGS. 1 through 10 illustrate a preferred embodiment of the invention, of which

FIG. 1 is a partly cutaway side view of an ultra-mini shovel car;

FIG. 2 is a vertically sectioned back view of a gear case;

FIG. 3 is an development explanatory of various shafts and meshed conditions of gears within the gear case;

FIG. 4 is a vertically sectioned front view of a jaw clutch;

FIG. 5 is a sectional view taken on line A—A of FIG. 4;

FIG. 6 is a perspective view of an FR switching shaft;

FIG. 7 is a partly cutaway side view of a shift lever stopper;

FIG. 8 is a partly cutaway back view of the shift lever stopper; and

FIGS. 9 and 10 are plan views explanatory of operations of a shift lever shock absorber; and FIGS. 11 through 14 illustrate a conventional counterpart, of which FIG. 11 is a vertically sectioned side view of a conventional jaw clutch;

FIGS. 12 and 13 are perspective views of FR switching shafts; and

FIG. 14 is a fragmentary plan view of ball drop-in portions.

DESCRIPTION OF PREFERRED EMBODIMENTS

Figure 1:
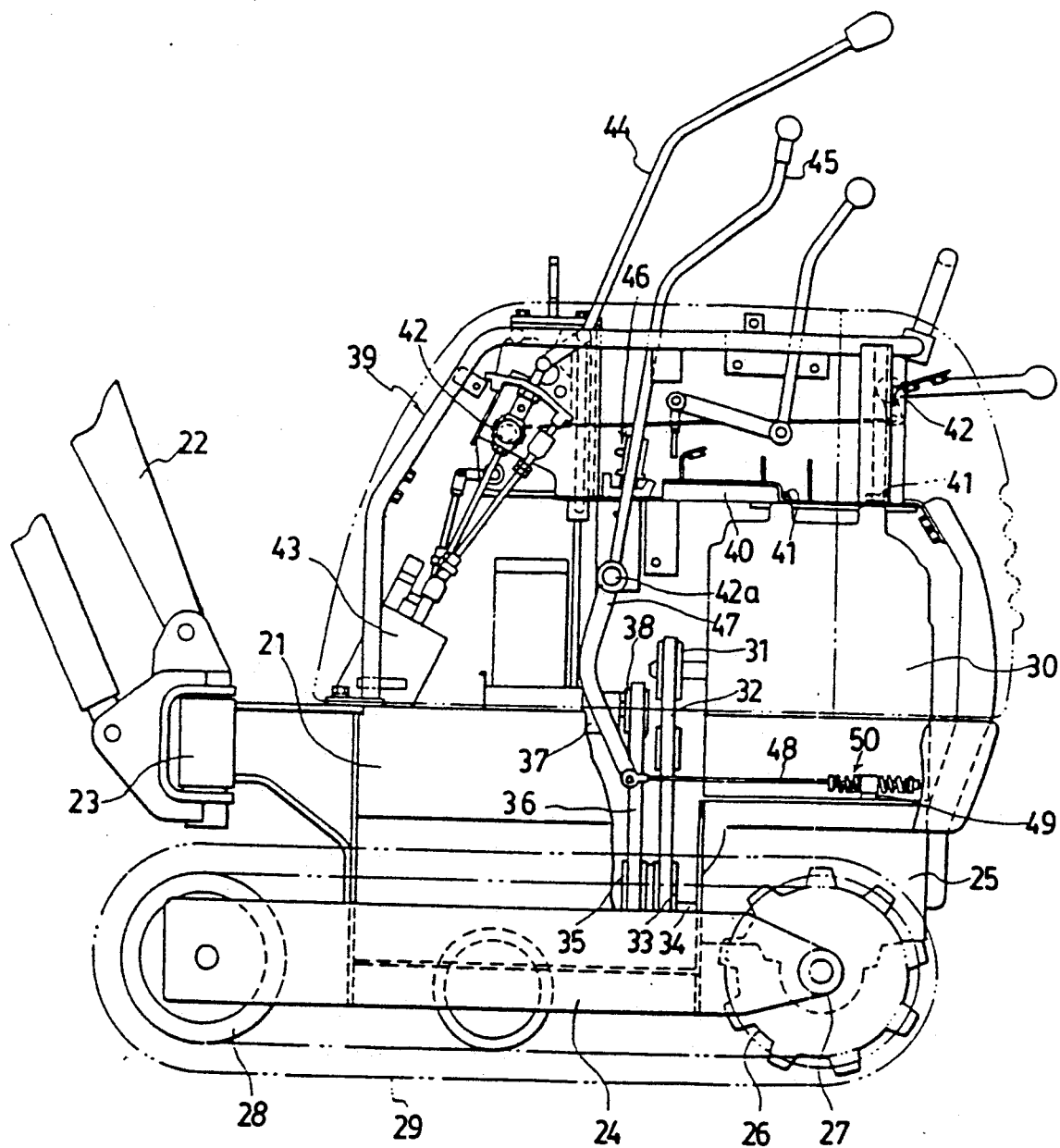

Hereafter, the invention is described more particularly by way of a preferred embodiment, with reference to FIGS. 1 through 10. Shown in FIG. 1 is a super-mini shovel car having a bracket 23 projected on the front side of an upper frame 21 for mounting a boom 22 thereon. The upper frame 21 has downwardly extending crawler frames 24 at the opposite sides thereof. A gear case 25 is mounted on the lower side of a rear portion of the upper frame 21, the gear case 25 having support shafts 27 for sprockets 26 at the opposite sides thereof. These support shafts 27 are connected to rear ends of the crawler frames 24 on the opposite sides of the vehicle, while driven wheels 28 are rotatably supported on for end portions of the crawler frames 24. A crawler 29 is passed between and around the drive sprocket 26 and driven wheel 28 on each side of the vehicle. Further, an engine 30 is mounted on the upper frame in a position above the gear case 25.

The power of the engine 30 is transmitted to a transmission pulley 33 through a belt 32 which is passed around an engine pulley 31 to rotate an input shaft 34 of the transmission. The transmission pulley 33 is in the form of a double pulley, having a coaxial pulley 35 to transmit power to a pulley 38 of a hydraulic pump 37 through a belt 36 which is passed therearound.

A bonnet frame 39 is fixedly mounted on top of the upper frame 21. A flat plate 40 is securely fixed on the upper surface of the engine 30 by means of a plural number of bolts 41 to provide mount portions 42 on the upper and lower sides of the plate 40 for various operating levers as will be described hereinlater. Provided in a front portion of the bonnet frame 39 are hydraulic pressure control valves 43 which are connected to left and right hydraulic operating levers 44. FR switching shift levers 45 are mounted behind the hydraulic operating levers 44. The left and right shift levers 45 are rockable back and forth about a pivot point 42a and releasably retained in one of forward, neutral and reverse positions by means of a shift lever stopper 46 which is fixedly mounted on the plate 40 as will be described hereinlater. An arm 47 is swingably suspended from the pivot point 42a of the shift lever 45 for rocking movements about the support shaft 42a in symmetric relation with the movements of the shift lever 45. The lower end of the arm 47 is pivotally connected to the fore end of a shifter rod 48. Projected laterally on the opposite sides of the gear case 25 are shifter arms 49 of the jaw clutch. The fore end portions of the shifter arms 49 are connected to a shock absorber 50 at the rear end of the corresponding shifter rod 48.

Figure 2:
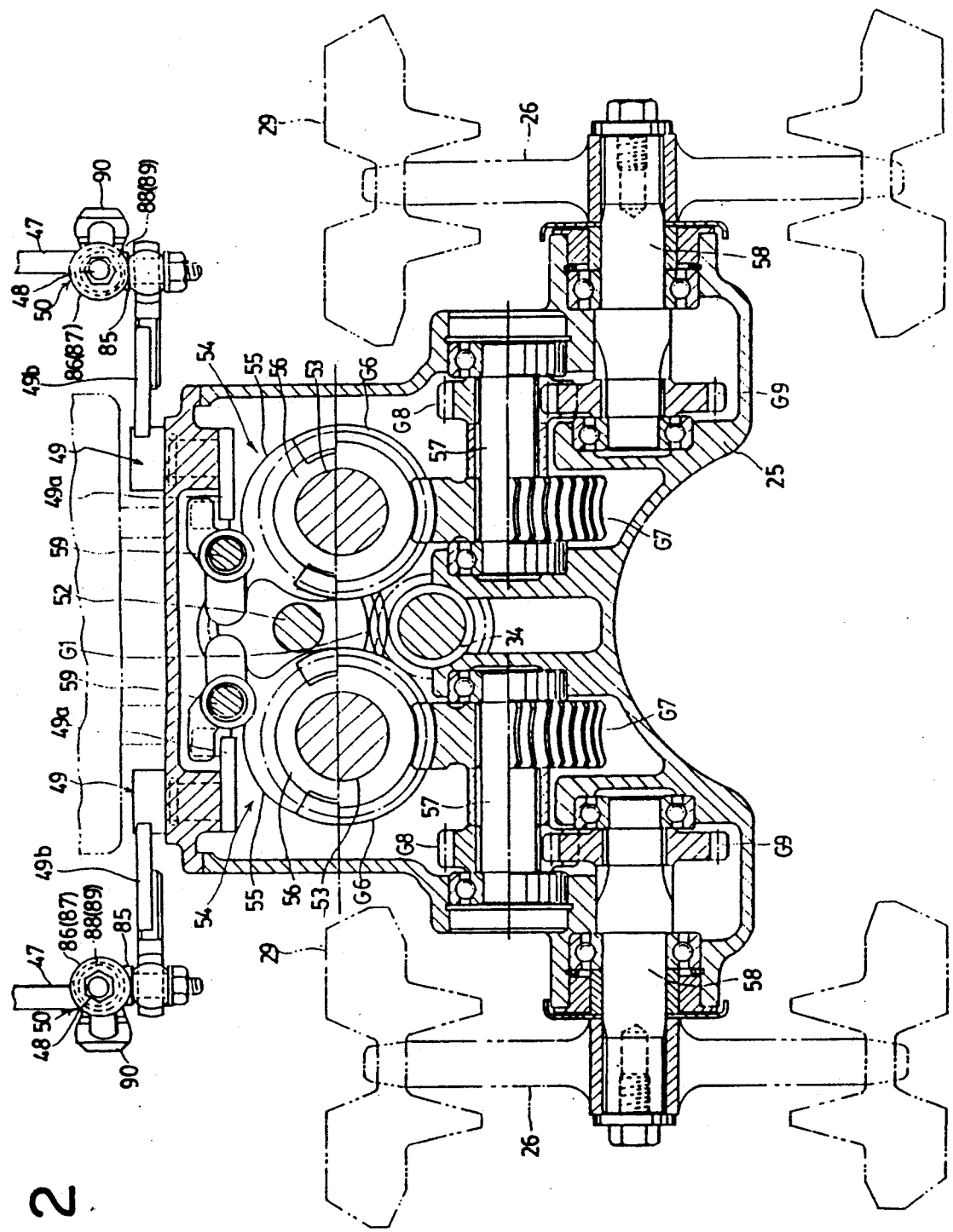
Figure 3:
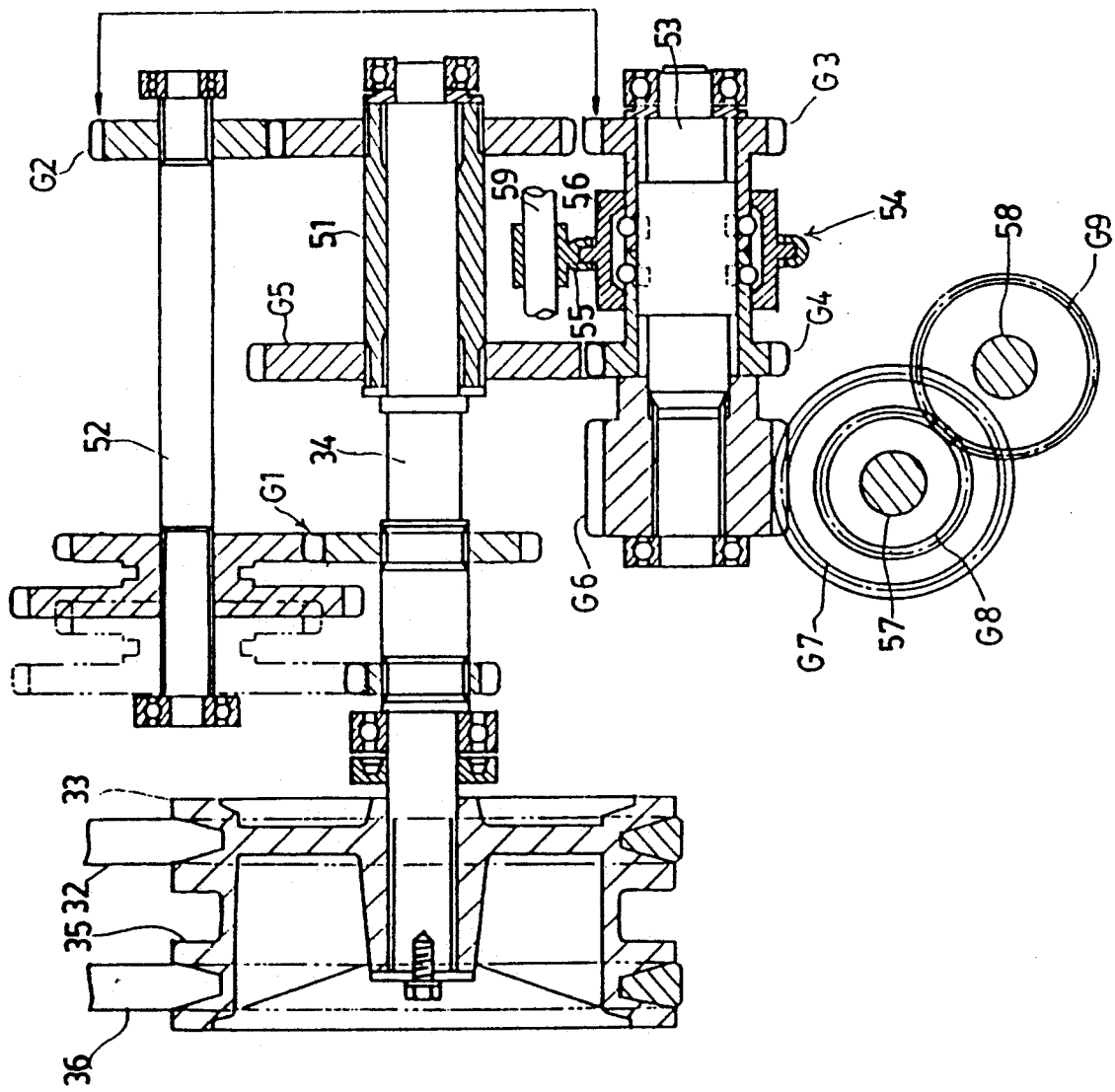

FIGS. 2 and 3 show the inside of the gear case 25 and the development explanatory of the various shafts and gears in meshed state. The input shaft 34 is rotatably supported in the gear case in the longitudinal direction and, as described hereinbefore, the fore end of the input shaft 34 is protruded from the gear case 25 in the forward direction. The input shaft 34 supports the transmission pulley 33 on its protruded end portion, and has a cylindrical sleeve 51 freely rotatably fitted on a rear portion of the input shaft 34. An auxiliary transmission shaft 52 is freely rotatably supported above the input shaft 34, and a couple of FR switching shafts 53 are freely rotatably supported on the opposite sides of the input shaft 34 in parallel relation therewith.

The rotation of the input shaft 34 is firstly transmitted to the auxiliary transmission shaft 52 after reduction through an auxiliary transmission gear G1 and then to the sleeve 51 through the drive gear G2. On the other hand, forward and reverse gears G3 and G4 are freely rotatably mounted side by side on each of the left and right FR switching shafts 52. A jaw clutch 54 is provided between these two gears G3 and G4, including a slider 56 which is slidable in the axial direction by means of a shifter 55. The drive gear G2 is constantly meshed with the forward gear G3, while a gear G5 on the sleeve 51 is constantly meshed with the reverse gear G4.

A worm gear G6 is mounted on a fore end portion of each FR switch shaft 53 and meshed with a worm wheel G7 which is mounted on an inner end portion of the corresponding one of worm wheel shafts 57, which are rotatably supported in the gear case 25 in a transverse direction. A reducing gear G8 which is mounted on an outer end portion of each worm wheel shaft 57 is meshed with a reducing gear G9 which is mounted on an inner end portion of the corresponding one of drive shafts 58, which are rotatably supported beneath the worm wheel shafts 57. Further, the outer ends of the drive shaft 58 are laterally protruded from the opposite sides of the gear case 25, and the drive sprockets 26 are mounted on the protruded end portions of the drive shafts 58. The crawlers 29 are lapped around these drive sprockets 26.

The above-mentioned shifter 55 is coupled with one end 49a of the shifter arm 49 which is freely rotatably fitted on the shifter shaft 59 and pivotally supported on the gear case 25. Accordingly, as the shifter arm 49 is turned in the horizontal direction, the shifter 55 is moved forward or rearward on the shifter shaft 59, thereby moving the slider 56 and engaging the jaw clutch 54 to transmit the rotation of either the forward gear G3 or the reverse gear G4 to the FR switching shaft 53.

Figure 4:
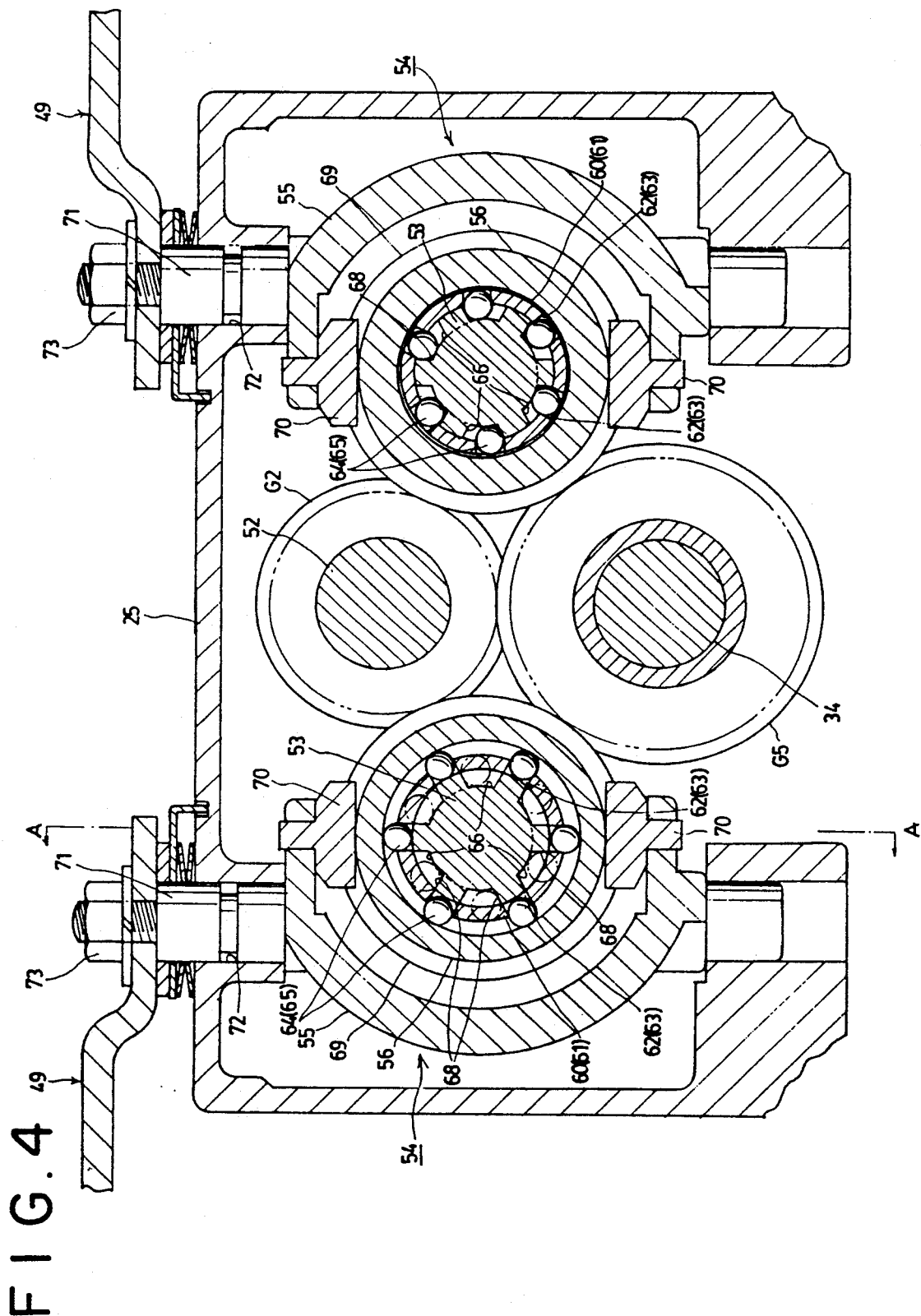
Figure 5:
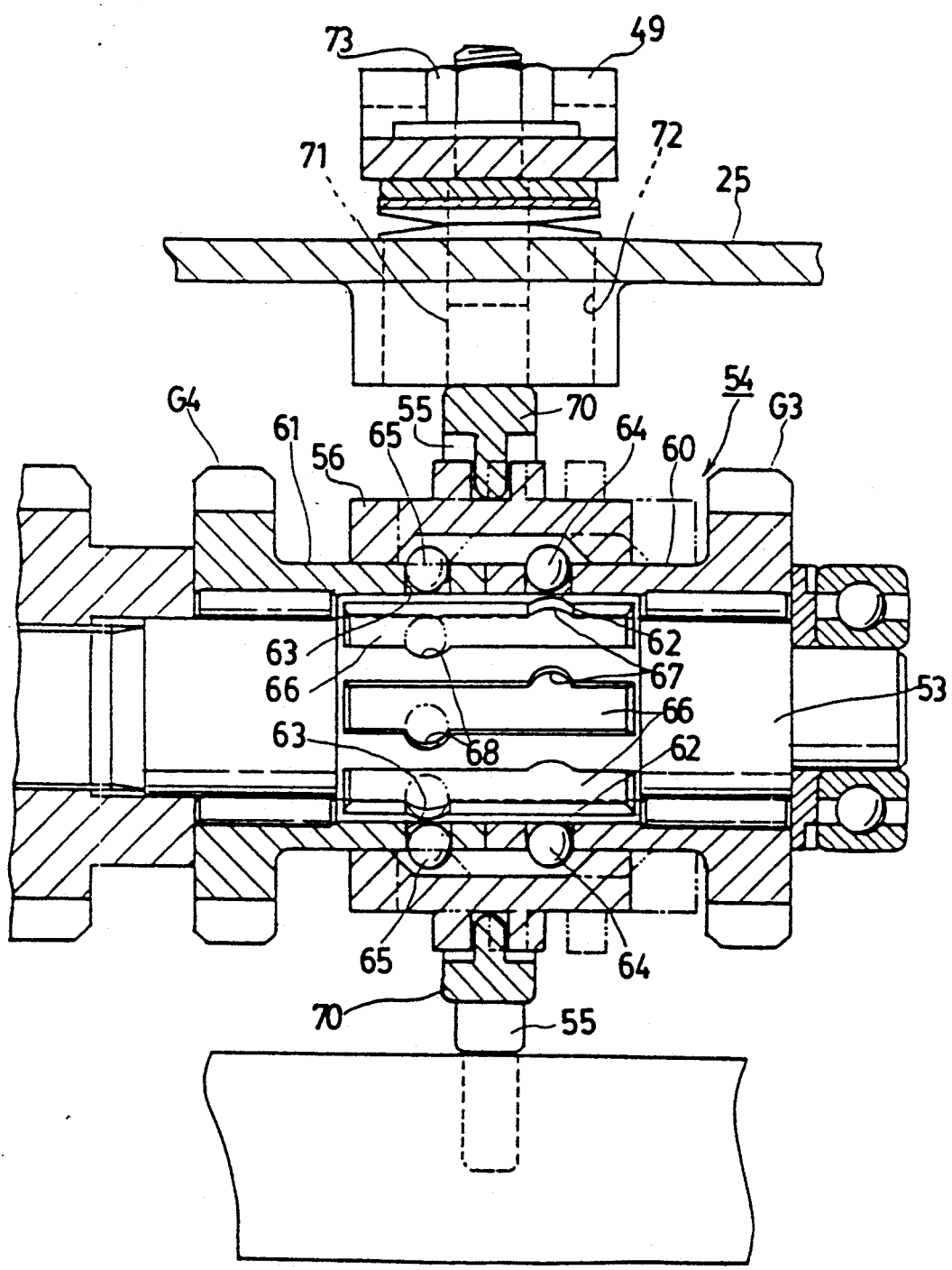

Turning now to the coupling mechanism for the jaw clutch 54, as shown in FIGS. 4 and 5, the jaw clutch 54 is provided in the gear case 25 including the input shaft 34, auxiliary transmission shaft 52 and a pair of FR switching shafts 53 rotatably supported in the gear case 25 in parallel relation in the longitudinal direction of the vehicle. As shown particularly in FIG. 3, the forward and reverse gears G3 and G4 are freely rotatably mounted on each FR switching shaft 53, the forward gear G3 being meshed with the drive gear G2 on the auxiliary transmission shaft 52 for transmission of forward driving force while the reverse gear G4 is meshed with a gear G5 on the sleeve, which is freely rotatable about the input shaft 34, for transmission of reverse driving force. As seen in FIG. 5, the forward and reverse gears G3 and G4 are provided with cylindrical extensions 60 and 61 opposingly in side by side relation. These extensions 60 and 61 have holes 62 or 63 bored at uniform intervals around the respective circumference to receive steel balls 64 or 65.

Figure 6:
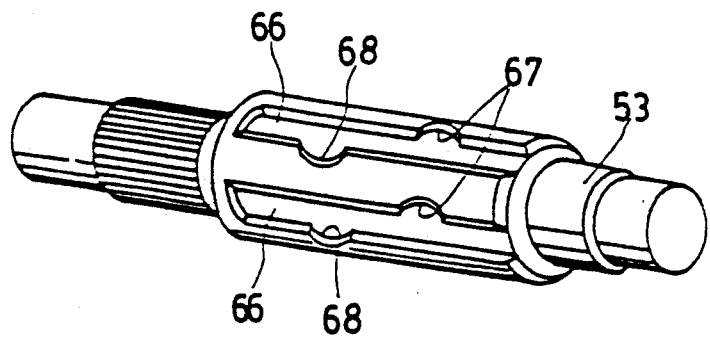

Now, reference is had to FIG. 6, a perspective view of the FR switching shaft 53, in addition to FIGS. 4 and 5. The FR switching shaft 53 is formed with spline grooves 66 as ball drop-in holes on its circumferential surface in a pitch corresponding to that of the ball retaining holes 62 and 63. The spline grooves 66 are provided with semi-spherical ball support recesses 67 in the respective side wall portions which engage the steel balls 64 in the forward rotation of the FR switching shaft, and with similar semi-spherical ball support recesses 68 in the respective side wall portions which engage the steel balls 64 in the reverse rotation of the FR switching shaft 53.

On the other hand, as shown in FIG. 4, the slider 56 is slidably fitted on the gear extensions 60 and 61 for sliding movements in the axial direction. The slider 56 is provided with a flange-like joint portion 69 which is interlocked with pusher members 70 of the shifter 55. The shifter 55 is formed in a semi-circular arcuate shape in front view, and securely connected at its upper end to a shifter arm shaft 71 which is protruded to the outside through an opening 72 in the gear case 25. The shifter arm shaft 71 which is protruded from the gear case 25 has the shifter arm 49 securely fastened thereto by a nut 73.

Thus, in order to actuate a jaw clutch 54 of this embodiment, the operator manipulates either one of the left and right FR switching shift levers 45, whereupon the shifter arm 49 is operated in a desired direction through the link mechanism to slide the slider in the forward or backward direction through the shifter 55. Accordingly, the steel balls 64 in the holes 62 or the steel balls 65 in the holes 63 are pushed into the spline grooves 66 on the FR switching shaft 53 to transmit forward or reverse driving force to the latter.

In this connection, the ball dropping portions are formed on the FR switching shaft 53 by the following steps. Firstly, the spline grooves 66 are cut out by a broaching operation, drawing a round rod in the axial direction. Nextly, the side wall portions which engage the steel balls 64 and 65 in the forward and reverse rotations are recessed into a semi-spherical shape by the use of an end mill to form the ball support recesses 67 and 68. Thus, each of the spline grooves 66 is formed with a ball support recess 67 for the forward rotation and a ball support recess 68 for the reverse rotation, providing a play in each rotational direction to ensure that a ball can engage the ball dropping portion in a facilitated manner without being repulsed therefrom.

Figure 8:
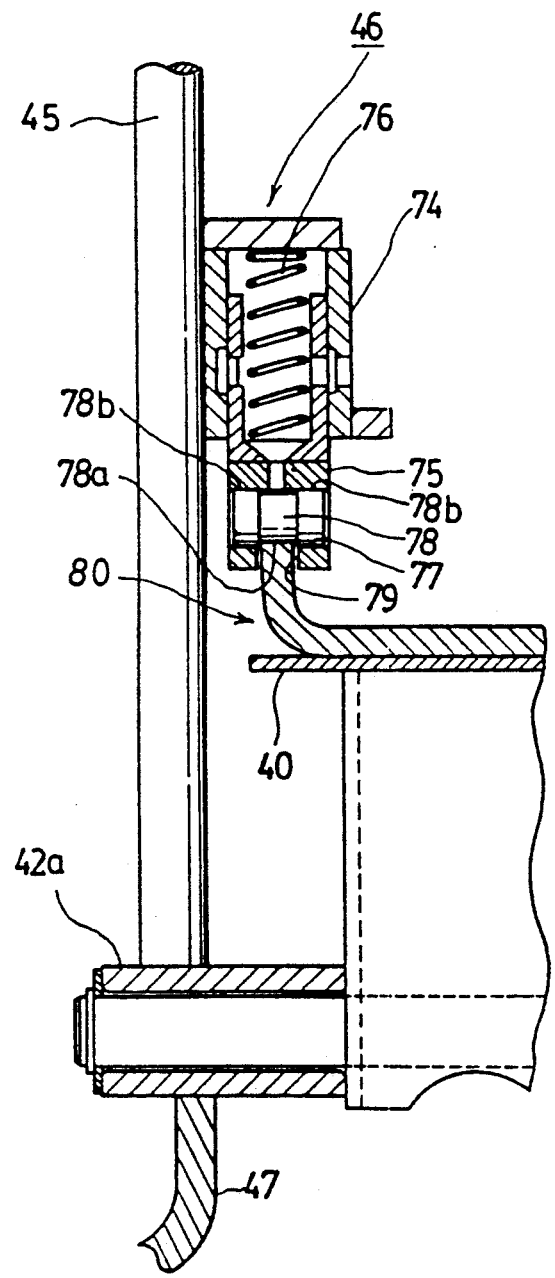
Figure 7:
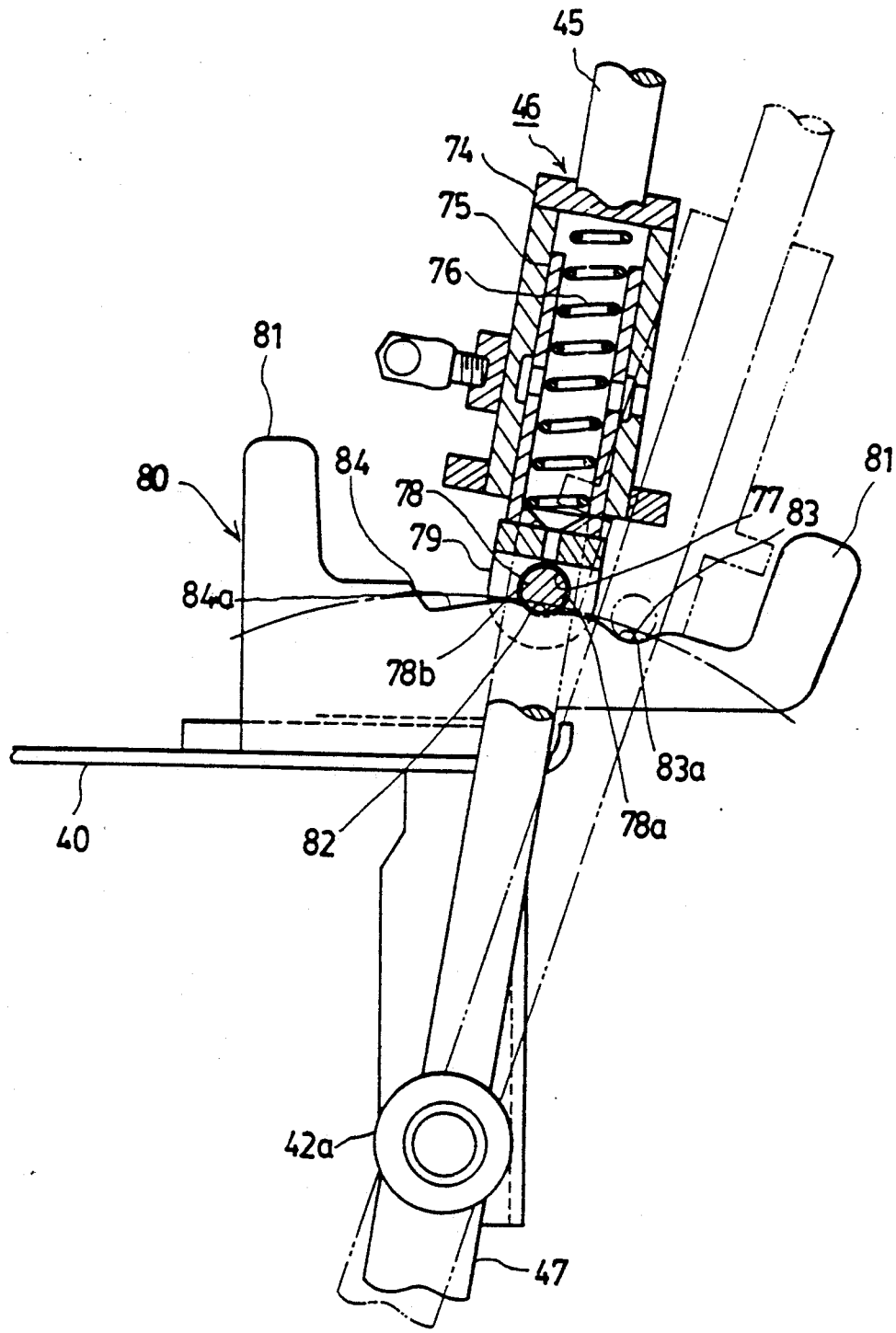

Referring to FIGS. 7 and 8, the stopper 46 for the shift lever 45 is constituted by a spring case 74 which is fixedly mounted at one side of the shift lever 45 in the vicinity of the pivot point 42a, a slider 75 freely slidably fitted in the spring case 74, and a spring 76 interposed between the spring case 74 and the slider 75. The slider 75 is provided with a roller 78, which is rotatably supported in lateral holes 77 bored laterally in a lower portion of the slider 75, and a guide groove 79 which is in engagement with the upper marginal edge portion of a cam plate 80. The roller 78 is constantly pressed downward by the action of the spring 76, against the upper marginal edge of the cam plate 80.

The above-described cam plate 80 consists of a plate of substantially L-shape in back view, and is provided with stopper projections 81 at the front and rear ends of the upper marginal edge, which contains a center groove 82 and fore and rear grooves 83 and 84 between the two projections for stopping the roller 78 therein. In the state shown in the drawing, the roller 78 is engaged with the center groove 82 to hold the shift lever 45 in "neutral" position. If the shift lever 45 is turned either in the forward or rearward direction, the roller 78 which is biased by the spring 76 is engaged with the groove 83 or 84 to retain the shift lever 45 in that position. In case the shift lever 45 is turned beyond the stop position, it is abutted against the stopper 81 which delimits the operable rotational angle of the shift lever 45. In FIG. 7, the one-dot chain line indicates the locus of movement of the roller 78 about the pivot point 42a. As clear from the locus, the fore and rear stopper grooves 83 and 84 are provided with chamfered portions 83a and 84a, respectively, thereby to urge the roller 78 into engagement with the stopper groove 83 or 84 quickly when the shift lever 45 is turned.

Center portion 78a of the roller 78 is formed in a smaller diameter than the opposite side portions 78a and abutted against the upper marginal edge portion of the cam plate 80 which is embraced by the guide groove 79 on the opposite sides thereof. Therefore, the shift lever 45 can be turned quite smoothly without spontaneous turns of the slider, securely stopping the shift lever 45 in "neutral", "forward" or "reverse" position by engagement of the roller 78 with either one of the grooves 82 to 84. Besides, since the roller 78 is arranged to grip the upper marginal edge portion of the cam plate 80 between its opposite side portions 78a of the roller 78, it can be assembled in an extremely simplified manner, namely, simply by inserting the roller 78 into the holes 77 of the slider 75 from one lateral side thereof. Once the cam plate 80 is abutted against the roller 78, there is no possibility of dislocation of the roller 78 which is held in position by the biasing force of the spring 76.

Figure 9:
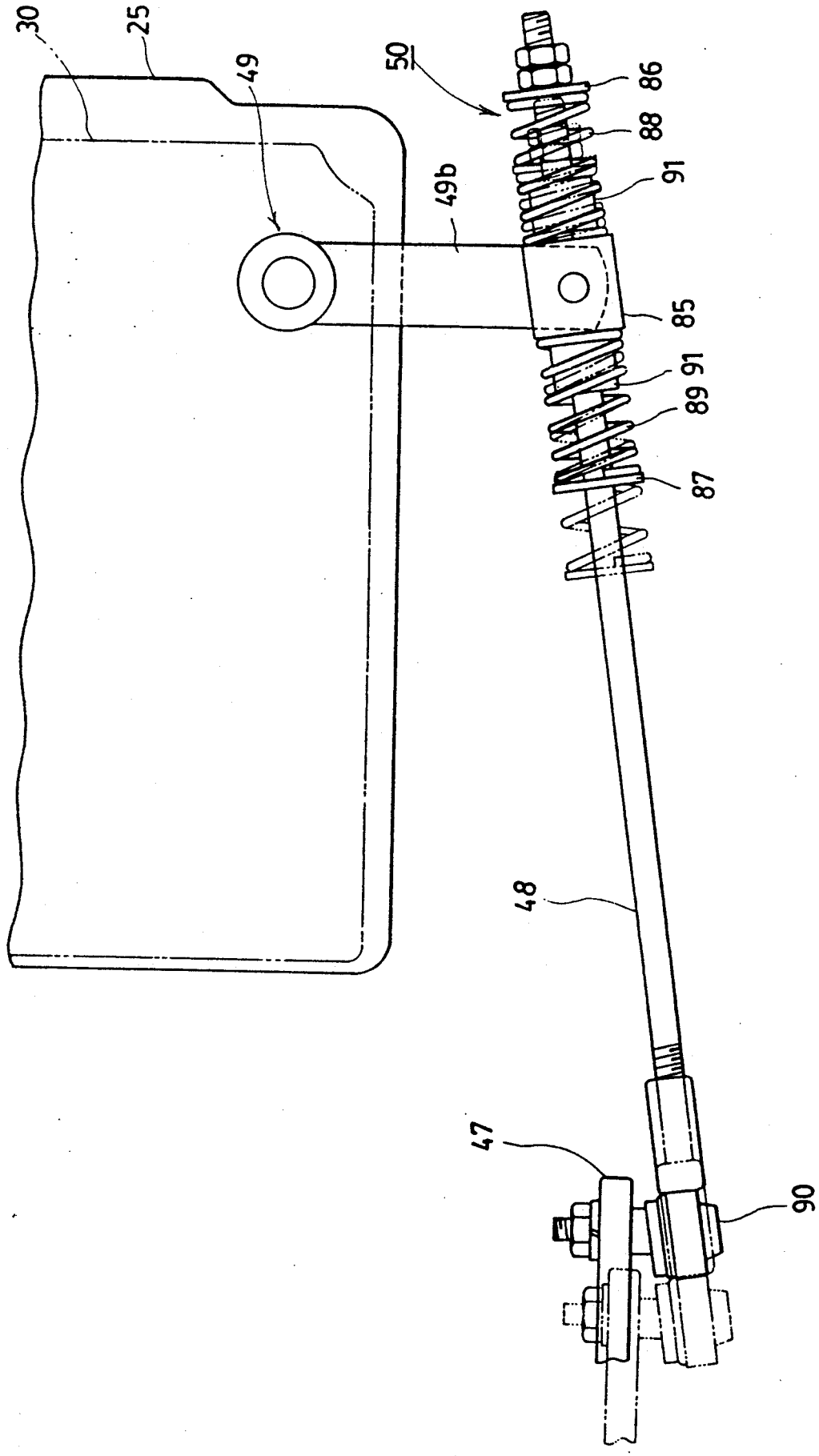

Referring now to FIGS. 2 and 9 for explanation of the shock absorber 50 for the shift lever 45, the shifter arms 49 on the gear case 25 are protruded on the opposite sides of the latter, each of the shifter arm having the outer end thereof pivotally supported on a lower portion of a stop ring 85 which is loosely fitted on a rear end portion of the shifter rod 48. The shifter rod 48 is provided with stopper members 86 and 87 in the rear end portion in spaced relation with each other in the axial direction. Springs 88 and 89 are loosely fitted on the shifter rod 48 between the stopper ring 85 and the stopper member 86 or 87. A fore end portion of the shifter rod 48 is pivotally connected to a lower end portion of the arm 47 through a joint 90.

Figure 10:
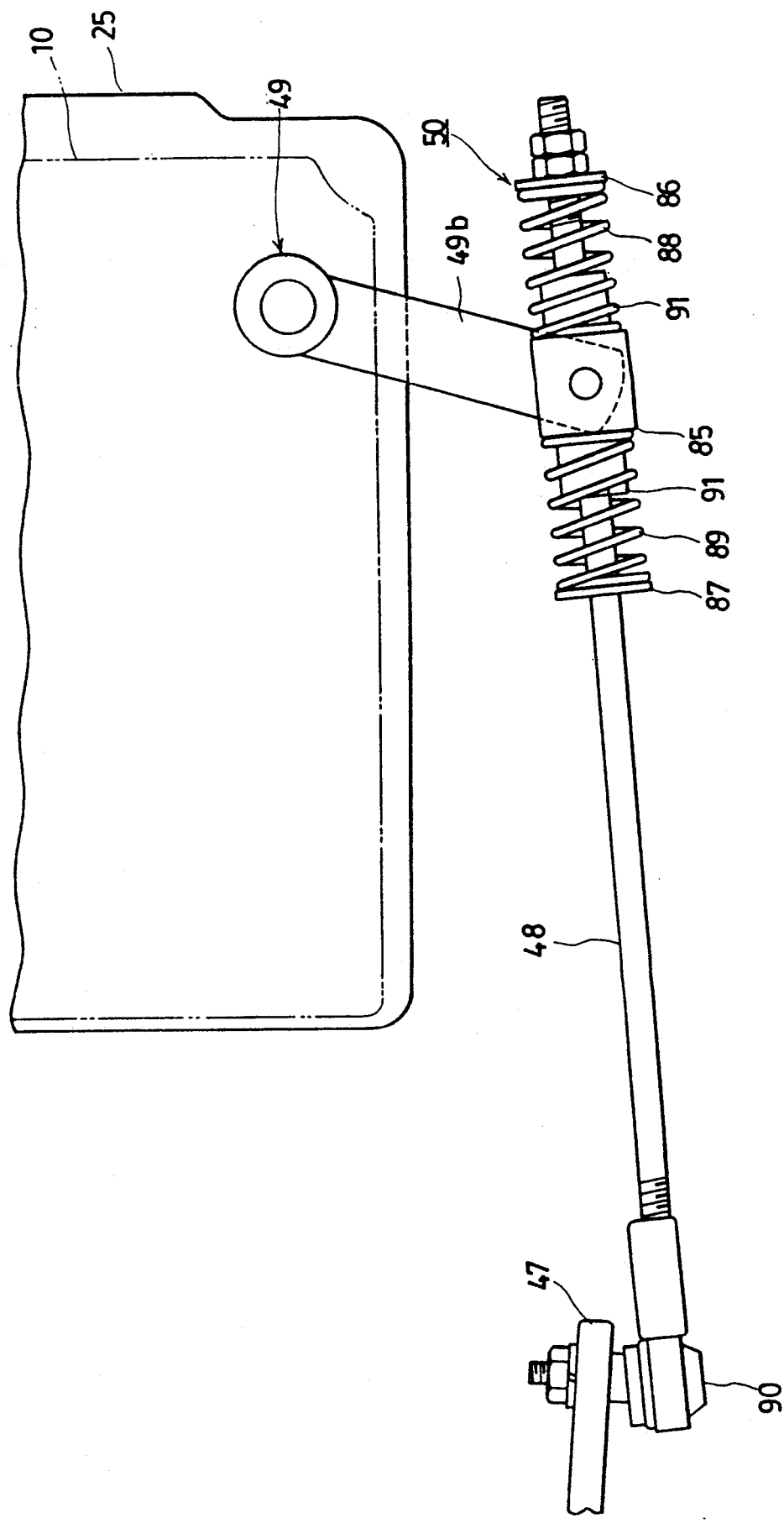
Figure 11:
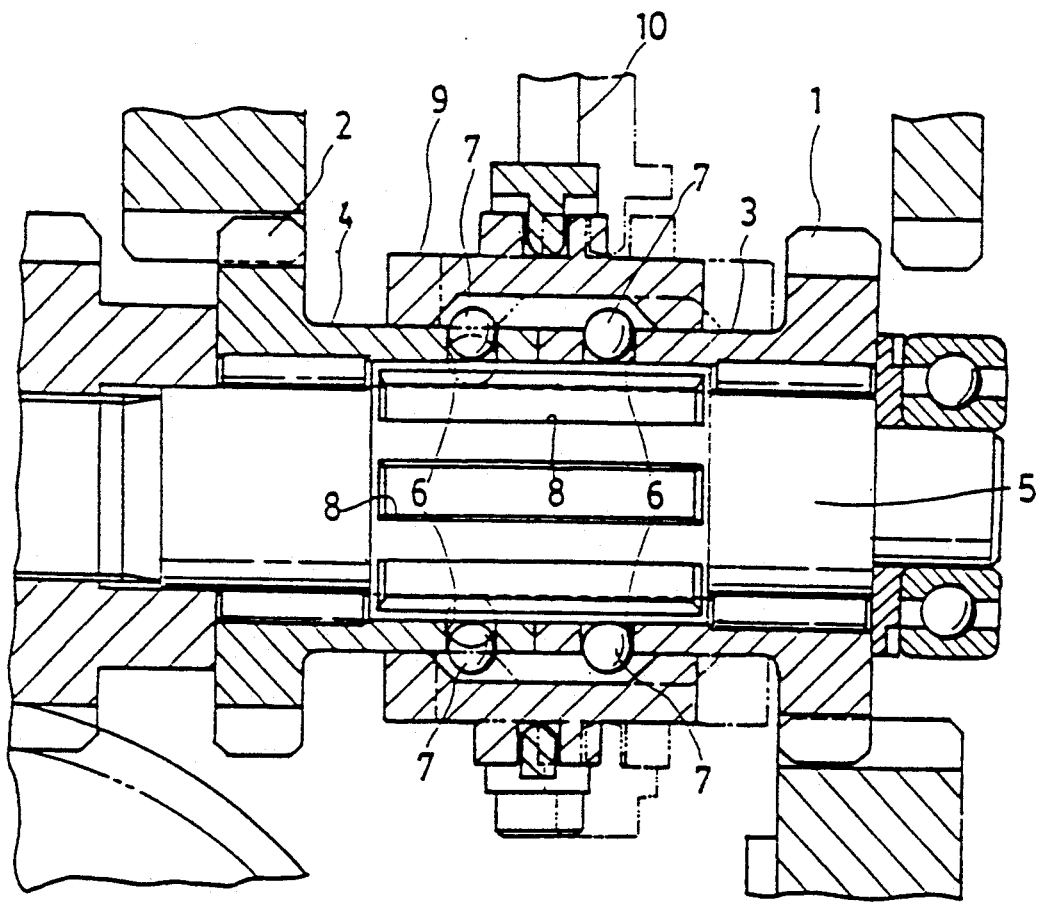
Figure 12:
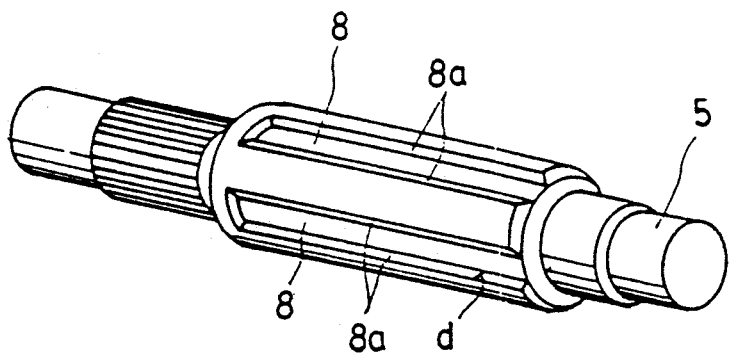
Figure 13:
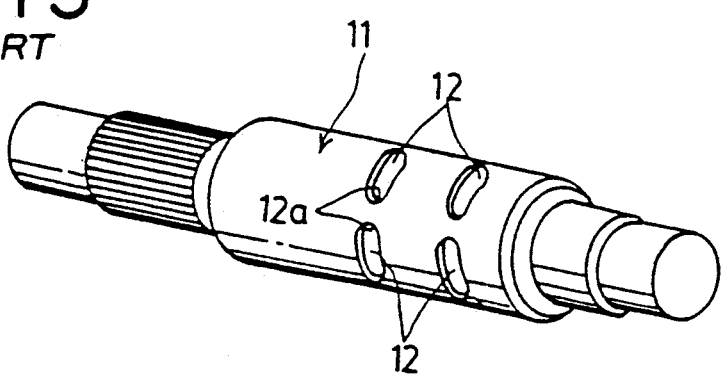
Figure 14:
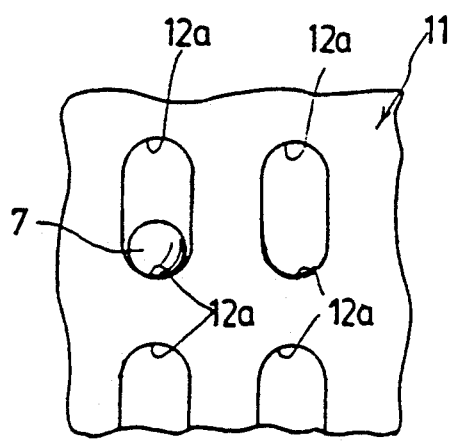

Thus, if the shift lever 45 of FIG. 1 is turned rearward, for example, the arm 47 is turned clockwise in FIG. 1 about the pivot point 22a, pulling the shifter rod 48 in the forward direction until the shift lever 45 is stopped in the groove 83 of the stopper mechanism 46 as indicated by a chain line in FIG. 7. Concurrently, the spring 88 is compressed until one end face of the collars 91 at the opposite ends of the stopper ring 85 comes into abutting engagement with one stopper member 86, while uncompressing the spring 89 on the side of the other stopper member 87. As a result, the shifter rod 48 alone is slided within the stopper ring 85 for displacement in the forward direction. Therefore, at this time there occurs no displacement of the stopper ring 85 nor rotational movement of the other end portion 49b of the shifter arm. Then, the stopper ring 85 is promptly pushed forward by the restitutive force of the spring 88, turning the shifter arm 49 to engage the jaw clutch 54. At this time, even if the steel balls were rebounded from the coupling portion of the jaw clutch without effecting smooth engagement of the clutch, the stopper ring 85 would be slided by the restitutive force of the aforementioned spring 88, turning the other end portion 49b of the shifter arm 49 to engage the jaw clutch forcibly as shown in FIG. 10. The timing of the clutch engagement can be suitably determined by adjusting the interval between the stopper members 86 and 87 and the force of the springs 88 and 89. Thus, the slider 56 shown in FIG. 5 is slided rearward to engage the steel balls 65 on the reverse gear G4 with the ball support grooves 68 of the spline grooves 66, thereby transmitting the reverse drive force to the FR switching shaft 53.

Conversely, in case the shift lever 45 is turned forward, it is stopped in the groove 84 of the stopper mechanism 46, compressing the spring 89 on the opposite side of the stopper 87. In this case, the shifter rod 48 is moved rearward in a manner inverse to the above-described operation, and then the shifter arm 49 is turned by the restitutive force of the spring 89, sliding forward the slider 56 of the jaw clutch 54 to engage the steel balls 64 on the forward gear G3 with the ball support grooves 67 of the spline grooves 66, thereby transmitting the forward driving force to the FR switching shaft 53.

Thus, when the shift lever 45 is turned to the forward or reverse position, the shifter arm 49 is not turned immediately upon operating the shift lever 45, engaging the jaw clutch 54 only after the shift lever 45 has been stopped in the selected position by the stopper mechanism. Accordingly, the impacts resulting from rebounding of the steel balls are absorbed by the shock absorber 50 to prevent direct transmission of coupling shocks to the operator's hand.

As clear from the foregoing detailed description of a preferred embodiment of the invention, the ball support recesses which are provided in the side walls of the spline grooves make a play which ensures facilitated engagement of the steel balls. These ball support recesses are formed in a semi-spherical shape for linear or surface contact with a steel ball, so that they are imparted with a higher surface pressure strength to endure the strong impacts which will be imposed at the time of engagement with a steel ball. Accordingly, they contribute to improve the operability and durability of the jaw clutch, precluding the percussive impressions which are found on the side walls of spline grooves as a result of collision of the steel balls in case of the conventional clutches.

The above-mentioned ball support grooves are formed into the side walls of the spline grooves by means of an end mill which can form a groove of semi-spherical shape within a short machining time. It follows that the machining cost can be reduced to a marked degree as compared with the machining of conventional spline grooves which need to be machined into rounded shape at the opposite ends thereof.

On the other hand, the provision of the shock absorber for the shift lever makes it possible to delay the rotational movement of the shifter arm when the shifter rod is moved back and forth by rotation of the shift lever. Therefore, the jaw clutch is forcibly engaged by the spring only after the shift lever has been stopped in the forward or reverse position, thereby smoothening the coupling of the jaw clutch and at the same time prohibiting the transmission to the shift lever of the shocks of engagement which would greatly discomfort the operator.

Further, the shift lever stopper mechanism is capable of securely holding the shift lever in the forward, neutral and reverse positions, improving the feeling of the shift lever operation. The stopper roller with a stepped surface can grip the upper marginal edge of the cam plate from the opposite sides to prevent dislocation of the roller from the latter. Besides, the forward and reverse grooves of the cam plate are provided with a chamfered portion at the respective center portions, so that the roller can be promptly urged into and stopped in the forward or reverse groove to shorten the shift time to the forward or reverse position.

Thus, the present invention contributes to improve the operability of the jaw clutch and provide shift lever stopper mechanism with a buffer of simple constructions, reducing the size of the transmission to such a degree as to permit applications to ultra- or super-mini shovel cars with small vehicle bodies.

Needless to say, it is possible for those skilled in the art to add various alterations or modifications to the particular forms described and shown herein, without departing from the scope of the invention as encompassed by the appended claims.

What is claimed is:

1. A jaw clutch coupling mechanism employing steel balls to be disengageably engaged with ball drop-in portions on a driven shaft by sliding movement of a slider fitted on the drive shaft, said jaw clutch coupling mechanism comprising:
   a gear case;
   a pair of driven shafts disposed within the gear case independently of and in parallel relation with each other to serve as FR switching shafts;
   forward and reverse gears freely and rotatably mounted on each of said FR switching shafts; and
   spline grooves formed axially on the circumferential surface of each FR switching shaft to serve as ball drop-in portions,
   wherein each of said spline grooves are provided with a semi-spherical ball support recess on a side wall portion to be engaged with a steel ball of said forward gear in forward rotation.

2. A jaw clutch coupling mechanism as defined in claim 1, wherein said spline grooves are formed on the surfaces of said FR switching shafts with equal pitches in the circumferential direction.

3. A jaw clutch coupling mechanism employing steel balls to be disengageably engaged with ball drop-in portions on a driven shaft by sliding movement of a slider fitted on the drive shaft, said jaw clutch coupling mechanism comprising:
   a gear case;
   a pair of driven shafts disposed within the gear case independently of and in parallel relation with each other to serve as FR switching shafts;
   forward and reverse gears freely and rotatably mounted on each of said FR switching shafts; and
   spline grooves formed axially on the circumferential surface of each FR switching shaft to serve as ball drop-in portions,
   wherein said spline grooves are each provided with a semi-spherical ball support recess on a side wall portion to be engaged with a steel ball of said reverse gear in reverse rotation.

4. A jaw clutch coupling mechanism as defined in claim 3, wherein said spline grooves are formed on the surfaces of said FR switching shafts with equal pitches in the circumferential direction.

* * * * *